(12) United States Patent
Wilton et al.

(10) Patent No.: US 10,106,024 B2
(45) Date of Patent: Oct. 23, 2018

(54) HYBRID MANUAL TRANSMISSION

(71) Applicant: GM Global Technology Operations LLC, Detroit, MI (US)

(72) Inventors: Daryl A. Wilton, Macomb, MI (US); James M. Hart, Belleville, MI (US)

(73) Assignee: GM GLOBAL TECHNOLOGY OPERATION LLC, Detroit, MI (US)

( * ) Notice: Subject to any disclaimer, the term of this patent is extended or adjusted under 35 U.S.C. 154(b) by 21 days.

(21) Appl. No.: 15/296,730

(22) Filed: Oct. 18, 2016

(65) Prior Publication Data

US 2018/0105031 A1    Apr. 19, 2018

(51) Int. Cl.

| | |
|---|---|
| *B60K 6/365* | (2007.10) |
| *B60K 6/48* | (2007.10) |
| *B60K 6/547* | (2007.10) |
| *F16H 3/00* | (2006.01) |
| *F16H 3/72* | (2006.01) |
| *F16H 37/06* | (2006.01) |

(52) U.S. Cl.
CPC ............... *B60K 6/365* (2013.01); *B60K 6/48* (2013.01); *B60K 6/547* (2013.01); *F16H 3/006* (2013.01); *F16H 3/724* (2013.01); *F16H 37/065* (2013.01); *B60Y 2200/92* (2013.01); *B60Y 2400/73* (2013.01); *Y10S 903/902* (2013.01)

(58) Field of Classification Search
CPC ........ F16H 3/006; F16H 3/724; F16H 37/065; B60K 6/365; B60K 6/48; B60K 6/547; B60K 2006/4825
See application file for complete search history.

(56) References Cited

U.S. PATENT DOCUMENTS

| | | | |
|---|---|---|---|
| 6,341,541 B1* | 1/2002 | Sakamoto | B60K 6/36 74/665 A |
| 7,325,662 B2 | 2/2008 | Maguire | |
| 7,604,565 B2* | 10/2009 | Lee | B60K 6/36 477/3 |
| 8,795,115 B2* | 8/2014 | Puiu | B60K 6/365 475/207 |
| 8,845,484 B2* | 9/2014 | Kamiya | F16D 48/0206 192/3.25 |
| 8,960,033 B2* | 2/2015 | Kaltenbach | B60K 6/48 74/331 |
| 9,168,918 B2* | 10/2015 | Lee | B60W 20/30 |
| 9,180,872 B2* | 11/2015 | Lee | B60W 20/40 |
| 9,222,563 B2* | 12/2015 | Kaltenbach | B60K 6/387 |
| 9,260,111 B2* | 2/2016 | Kobayashi | F02N 11/006 |
| 9,624,992 B2* | 4/2017 | Kasuya | B60K 6/48 |
| 2005/0139035 A1* | 6/2005 | Lee | B60K 6/36 74/661 |
| 2006/0254872 A1* | 11/2006 | Maguire | B60K 17/02 192/70.27 |

(Continued)

*Primary Examiner* — Ramya P Burgess
*Assistant Examiner* — David R Morris
(74) *Attorney, Agent, or Firm* — Harness, Dickey & Pierce, P.L.C.

(57) ABSTRACT

A vehicle powertrain includes a manual transmission with an input shaft including a plurality of input gears and at least one main shaft including a plurality of driven gears engaged with the input gears. An engine includes a drive shaft drivingly connected to the input shaft via an engine disconnect clutch and a launch clutch. An electric motor is non-concentric with the input shaft and is drivingly connected to the input shaft via the launch clutch.

11 Claims, 6 Drawing Sheets

(56) References Cited

U.S. PATENT DOCUMENTS

| | | | |
|---|---|---|---|
| 2013/0210567 A1* | 8/2013 | Puiu | B60K 6/365 475/5 |
| 2013/0310216 A1* | 11/2013 | Kamiya | F16D 48/0206 477/5 |
| 2013/0324362 A1* | 12/2013 | Lee | B60W 20/30 477/5 |
| 2013/0337972 A1* | 12/2013 | Lee | B60W 20/40 477/5 |
| 2013/0345018 A1* | 12/2013 | Kaltenbach | B60K 6/48 477/5 |
| 2014/0000412 A1* | 1/2014 | Kaltenbach | B60K 6/387 74/661 |
| 2014/0195089 A1* | 7/2014 | Kobayashi | F02N 11/006 701/22 |
| 2014/0288754 A1* | 9/2014 | Kasuya | B60K 6/48 701/22 |
| 2015/0021112 A1* | 1/2015 | Schmidt | B60K 5/02 180/243 |
| 2017/0096137 A1* | 4/2017 | Toyama | B60K 6/365 |

* cited by examiner

HYBRID MANUAL TRANSMISSION

FIELD

The present disclosure relates to a vehicle powertrain having a hybrid manual transmission with an electric motor input.

BACKGROUND

This section provides background information related to the present disclosure which is not necessarily prior art.

Hybrid vehicles may operate in an electric only drive configuration, in which an electric motor provides the drive torque to a transmission to power the vehicle, or may alternatively operate in a hybrid drive configuration, in which either the electric motor and/or an internal combustion engine may be engaged to provide the drive torque to the transmission. When operating in the electric only drive configuration, the internal combustion engine must be disconnected from the electric motor and the transmission so that the electric motor does not transfer torque to the internal combustion engine. When operating in the hybrid drive configuration, the electric motor and the internal combustion engine may be coupled together and/or coupled to the transmission to transmit torque therebetween.

The transmission includes a gearbox that provides a plurality of different gear ratios used to alter a speed and/or torque output from the transmission to the drive wheels of the vehicle. Manual transmissions are more efficient than automatic transmissions due to the energy loss associated with a torque converter of the automatic transmissions. Accordingly, a hybrid vehicle utilizing a manual transmission may be more fuel efficient than the same hybrid vehicle utilizing an automatic transmission. However, the manual transmission, when positioned in a drive gear, is rotationally fixed to the torque providing source, e.g., the internal combustion engine. As noted above, when operating in the hybrid drive configuration, the internal combustion engine must be disconnected from the electric motor and the transmission.

SUMMARY

This section provides a general summary of the disclosure, and is not a comprehensive disclosure of its full scope or all of its features.

A vehicle powertrain includes a manual transmission with an input shaft including a plurality of input gears and at least one main shaft including a plurality of driven gears engaged with the input gears. An engine includes a drive shaft drivingly connected to the input shaft via an engine disconnect clutch and a launch clutch. An electric motor is non-concentric with the input shaft and is drivingly connected to the input shaft via the launch clutch.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
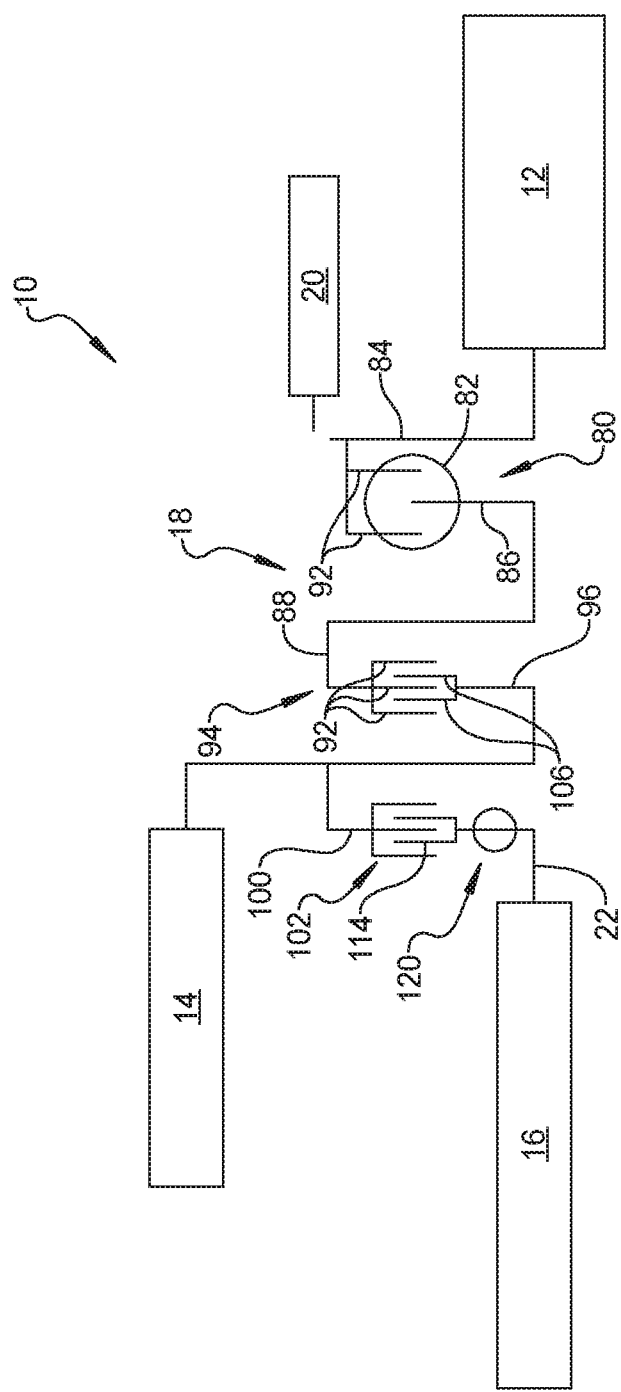
FIG. 1 is a schematic view of a vehicle powertrain with an engine and hybrid manual transmission with an electric motor input.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a vehicle powertrain 10 is shown including an engine 12 and an electric motor 14 each drivingly connected to a manual transmission 16 via a clutch system 18. The engine can include a starter motor 20.

Figure 2:
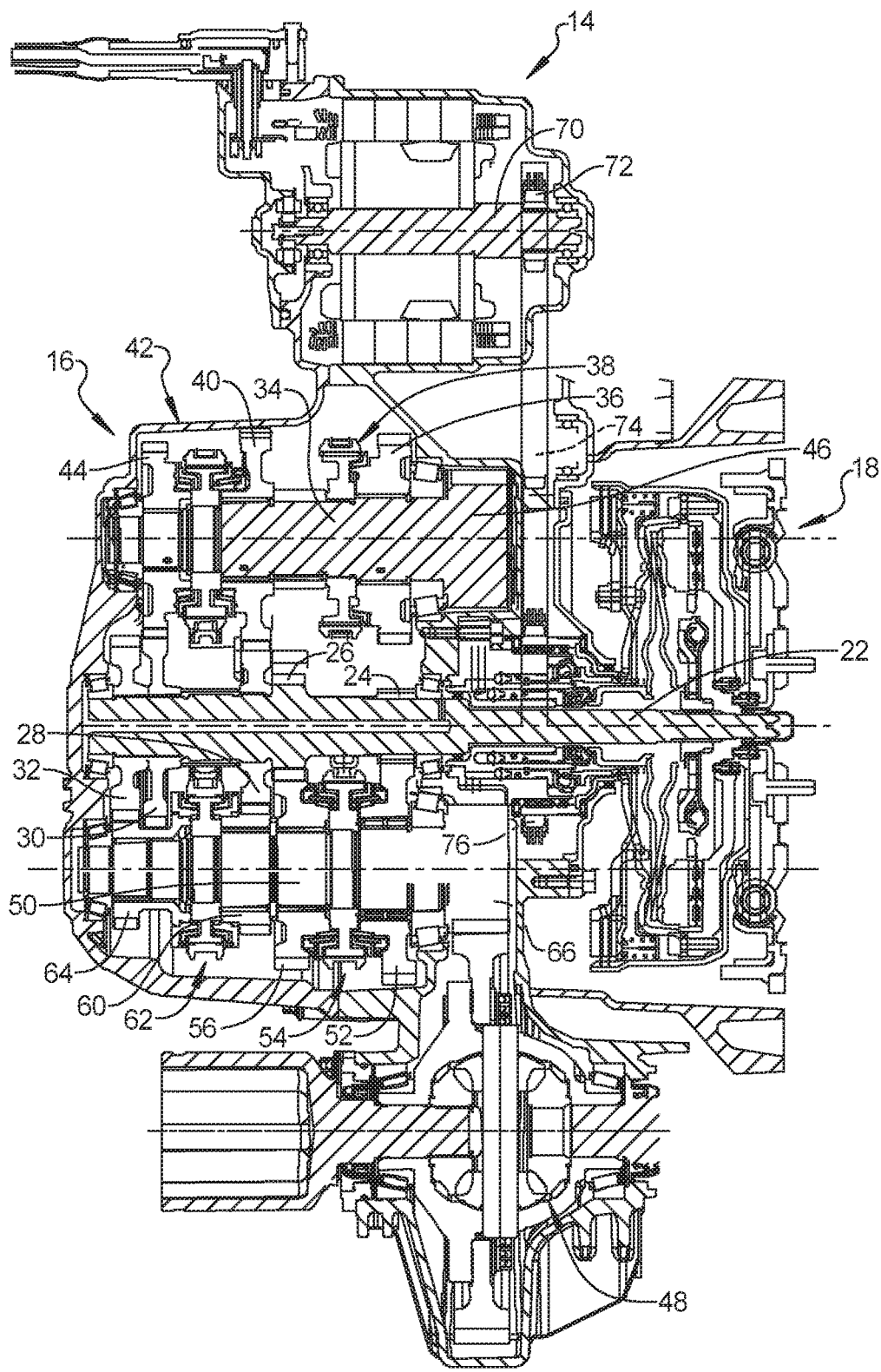
FIG. 2 is a schematic illustration in partial cross-sectional and fragmentary view of a hybrid manual transmission included in the powertrain of FIG. 1.

With reference to FIG. 2, the manual transmission 16 can include an input shaft 22 that includes a $1^{st}$ gear input gear 24, a $2^{nd}$ gear input gear 26, a $3^{rd}/5^{th}$ gear input gear 28, a $4^{th}$ gear input gear 30, and a $6^{th}$ gear input gear 32. An upper main shaft 34 is provided with a reverse gear 36 that engages the $1^{st}$ gear input gear 20 via a reverse idler gear (not shown). The reverse gear 36 is selectively engageable to the upper main shaft 34 by a synchronizer 38. A $3^{rd}$ gear driven gear 40 is provided on the upper main shaft 34 and is selectively engageable thereto by a double synchronizer 42. A $4^{th}$ gear driven gear 44 is provided on the upper main shaft 34 and is selectively engageable thereto by the double synchronizer 42. The upper main shaft 34 includes an output gear 46 that can be in driving engagement with an output member such as a differential 48.

A lower main shaft 50 is provided with a $1^{st}$ gear driven gear 52 that engages the $1^{st}$ gear input gear 24 and is engageable to the lower main shaft 50 by a double synchronizer 54. A $2^{nd}$ gear driven gear 56 that engages the $2^{nd}$ gear input gear 26 is provided on the lower main shaft 50 and is selectively engageable thereto by the double synchronizer 54. A $5^{th}$ gear driven gear 60 that engages the $3^{rd}/5^{th}$ gear input gear 28 is provided on the lower main shaft 50 and is selectively engageable thereto by a double synchronizer 62. A $6^{th}$ gear driven gear 64 that engages the $6^{th}$ gear input gear 32 is provided on the lower main shaft 50 and is selectively engageable thereto by the double synchronizer 62. The lower main shaft 50 includes an output gear 66 that can be in driving engagement with the output member such as the differential 48.

Figure 3:
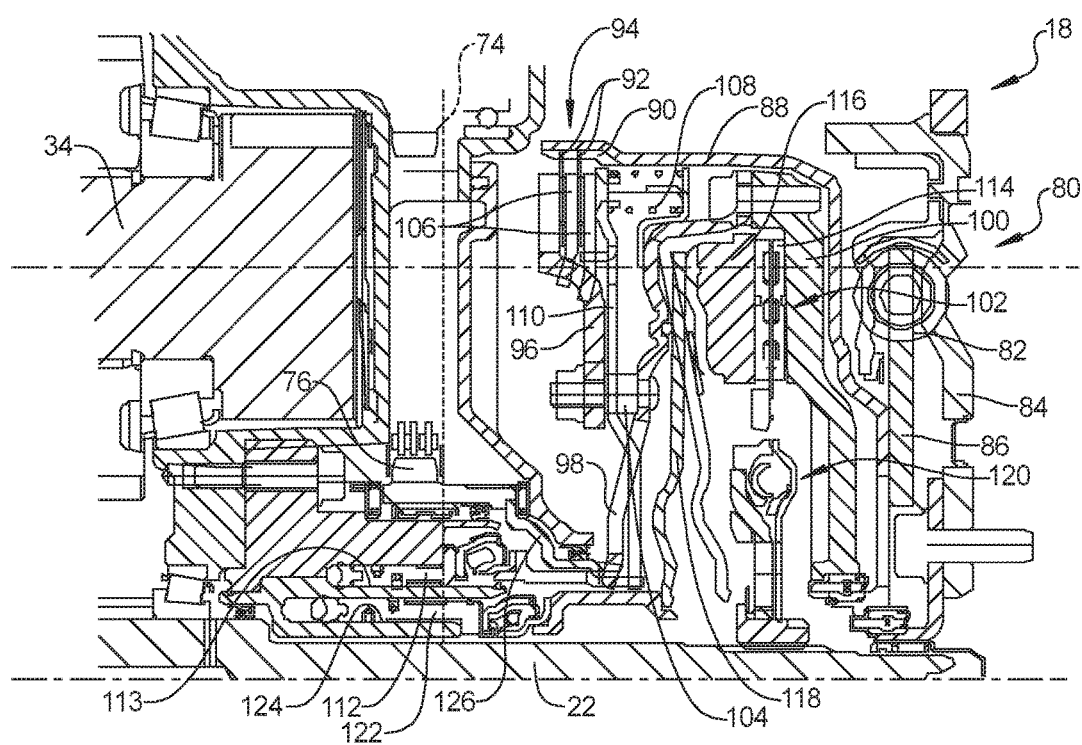
FIG. 3 is an enlarged schematic illustration of the clutch system for engaging the electric motor of the powertrain shown in FIG. 2.

The electric motor 14 includes a drive shaft 70 that can include a drive sprocket 72 thereon. With reference to FIGS. 2 and 3, a chain 74 is connected to the drive sprocket 72 of the electric motor 14 and a driven sprocket 76 drivingly connected to the clutch system 18. With particular reference to FIGS. 1 and 3, the clutch system 18 can include a long travel damper 80 drivingly connected to the engine 12. The long travel damper 80 includes a plurality of springs 82 disposed between a flywheel 84 connected to the engine 12 crankshaft and a driven plate 86. The driven plate 86 is connected to a clutch pack drum 88 including an internally splined surface 90 receiving clutch discs 92 of an engine disconnect clutch 94. The engine disconnect clutch 94 includes a clutch driven plate 96 that is connected to a drive drum 98 and drive plate 100 of a launch clutch 102 by a plurality of guide pins 104. The engine disconnect clutch 94 includes a plurality of clutch discs 106 interleaved with the clutch discs 92. A spring pack 108 presses against a spring plate 110 for biasing the disconnect clutch 94 in an engaged position. The spring plate 110 is engaged with a first release piston 112 provided within a first cylinder 113 for pivoting the spring plate 110 against the biasing force of the spring pack 108 to release the engagement force on the clutch discs 92, 106. Supplying hydraulic fluid to the release piston 112 causes disengagement of the engine disconnect clutch 94.

The launch clutch 102 further includes a clutch disk 114 and a pressure plate 116. A spring plate 118 presses the pressure plate 116 against the clutch disc 114 for providing driving torque from the drive plate 100 to the clutch disc 114. The clutch disc 114 is connected to the transmission input shaft 22 via a damping element 120. A second release piston 122 is provided within a second cylinder chamber 124 for engagement with the spring plate 118 and can be actuated to disengage the launch clutch 102. As shown in FIG. 3, the driven sprocket 76 that is driven by the drive sprocket 72 and chain 74, is connected to the drive drum 98 via the sprocket hub assembly 126 so as to provide drive torque to the input shaft 22 of the transmission 16 via the launch clutch 102.

In operation, the engine 12 provides driving torque to the manual transmission 16 via engagement of the engine disconnect clutch 94 and the launch clutch 102. The engine 12 can be disconnected from the manual transmission 16 by actuating the first release piston 112 to disengage the engine disconnect clutch 94. The drive torque form the electric motor 14 can be delivered to the manual transmission via the drive sprocket 72 driving the chain 74 which dives the driven sprocket 76. The driven sprocket 76 drives the sprocket hub assembly 126 and the drive drum 98. With the launch clutch 102 engaged, drive torque is transmitted from the electric motor 14 to the input shaft 22 of the manual transmission 16.

Figure 4:
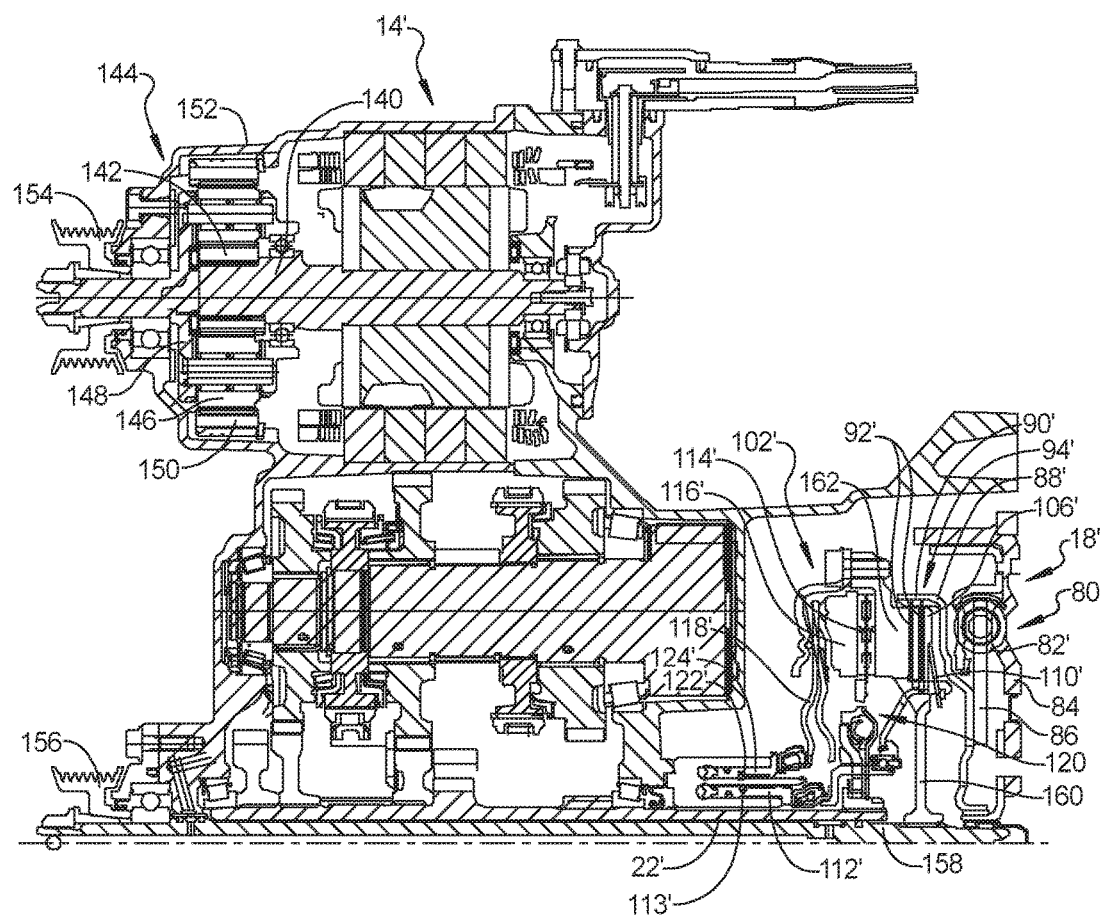
FIG. 4 is a schematic illustration of an alternative clutch system for engaging the electric motor of a hybrid manual transmission of a vehicle powertrain.
Figure 5:
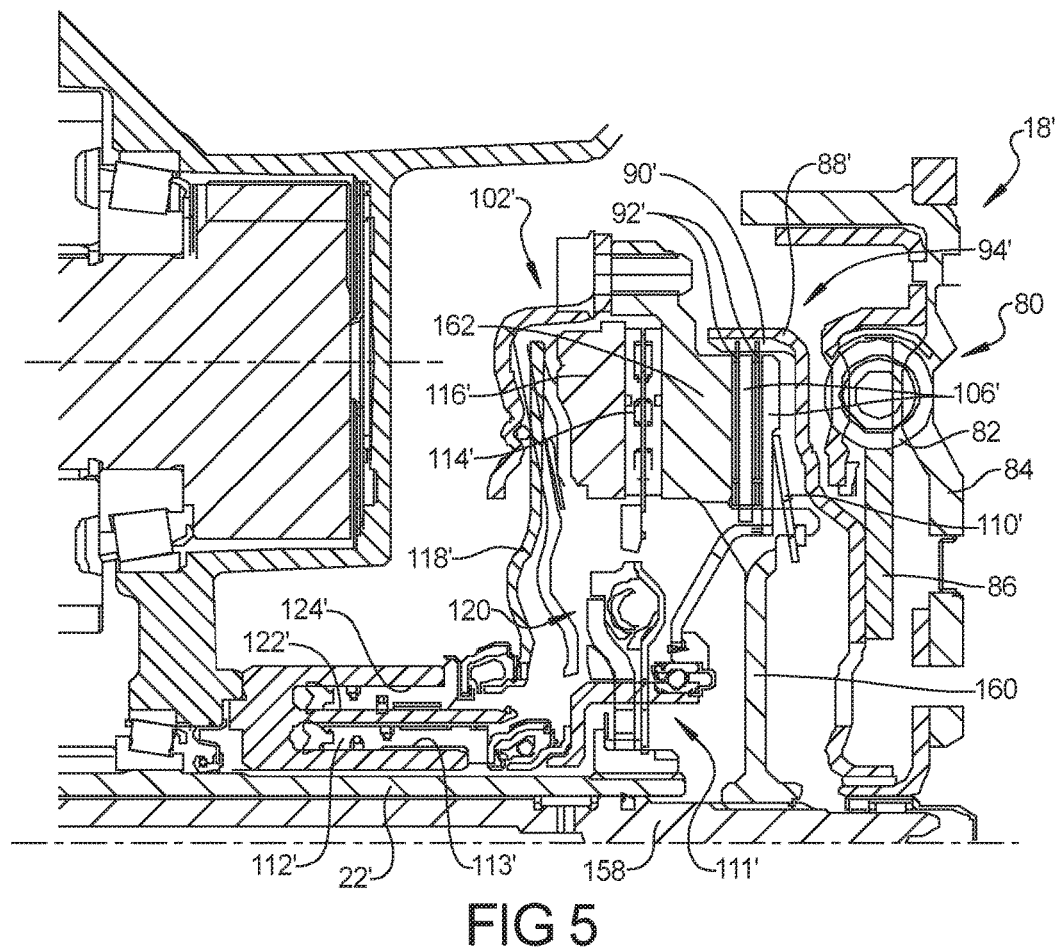
FIG. 5 is a detailed schematic illustration of the clutch system of FIG. 4.

According to an alternative embodiment as shown in FIGS. 4 and 5 wherein the same or similar reference numerals are used to represent the same or similar components, the electric motor 14' includes a drive shaft 140 that is connected to a sun gear 142 of a planetary gear set 144. The sun gear 142 is in meshing engagement with a plurality of planetary gears 146 that rotatably supported by a planetary carrier 148. The planetary gears 146 are also in driving engagement with a ring gear 150 that is fixed to a housing 152. The planetary carrier 148 is connected to a drive pulley 154 the drive pulley 154 is connected to a driven pulley 156 by a belt (not shown). The driven pulley 156 is connected to a primary input shaft 158 that is received in and extends through a modified hollow transmission input shaft 22'.

As best shown in FIG. 5, the clutch system 18' can include a long travel damper 80 drivingly connected to the engine 12. The long travel damper 80 includes a plurality of springs 82 disposed between a flywheel 84 connected to a crankshaft of the engine 12 and a driven plate 86. The driven plate 86 is connected to a clutch pack drum 88' including an internally splined surface 90' receiving clutch discs 92' of an engine disconnect clutch 94'. The engine disconnect clutch 94' includes a clutch hub 160 that is connected to the primary input shaft 158 and a drive plate 162 of a launch clutch 102'. The engine disconnect clutch 94' includes a plurality of clutch discs 106' interleaved with the clutch discs 92' and drivingly connected to the clutch hub 160. A spring plate 110' biases the disconnect clutch 94' in an engaged position. The spring plate 110' is engaged with an actuating assembly 111' including a first release piston 112' provided within a first cylinder 113' for pivoting the spring plate 110' against the biasing force of the spring plate 110' to release the engagement force on the clutch discs 92', 106'. Supplying hydraulic fluid to the release piston 112' thereby causes disengagement of the engine disconnect clutch 94'.

The launch clutch 102' further includes a clutch disk 114' and a pressure plate 116'. A spring plate 118' presses the pressure plate 116' against the clutch disc 114' for providing driving torque from the drive plate 162 to the clutch disc 114'. The clutch disc 114' is connected to the transmission input shaft 22' via a damping element 120. A second release piston 122' is provided within a second cylinder chamber 124' for engagement with the spring plate 118' and can be actuated to disengage the launch clutch 102'. As shown in FIG. 4, the driven pulley 156 that is driven by the drive pulley 154 and belt (not shown), is connected to the clutch hub 160 via the primary input shaft 158 so as to provide drive torque to the input shaft 22' of the transmission 16 via the launch clutch 102'.

In operation, the engine 12 provides driving torque to the manual transmission 16 via engagement of the engine disconnect clutch 94' and the launch clutch 102'. The engine 12 can be disconnected from the manual transmission 16 by actuating the first release piston 112' to disengage the engine disconnect clutch 94'. The drive torque form the electric motor 14' can be delivered to the manual transmission 16 via the drive pulley 154 driving the belt which dives the driven pulley 156. As the driven pulley 156 drives the primary input shaft 158 and the clutch hub 160 with the launch clutch 102' engaged, drive torque is transmitted from the electric motor 14' to the input shaft 22' of the manual transmission 16.

Figure 6:
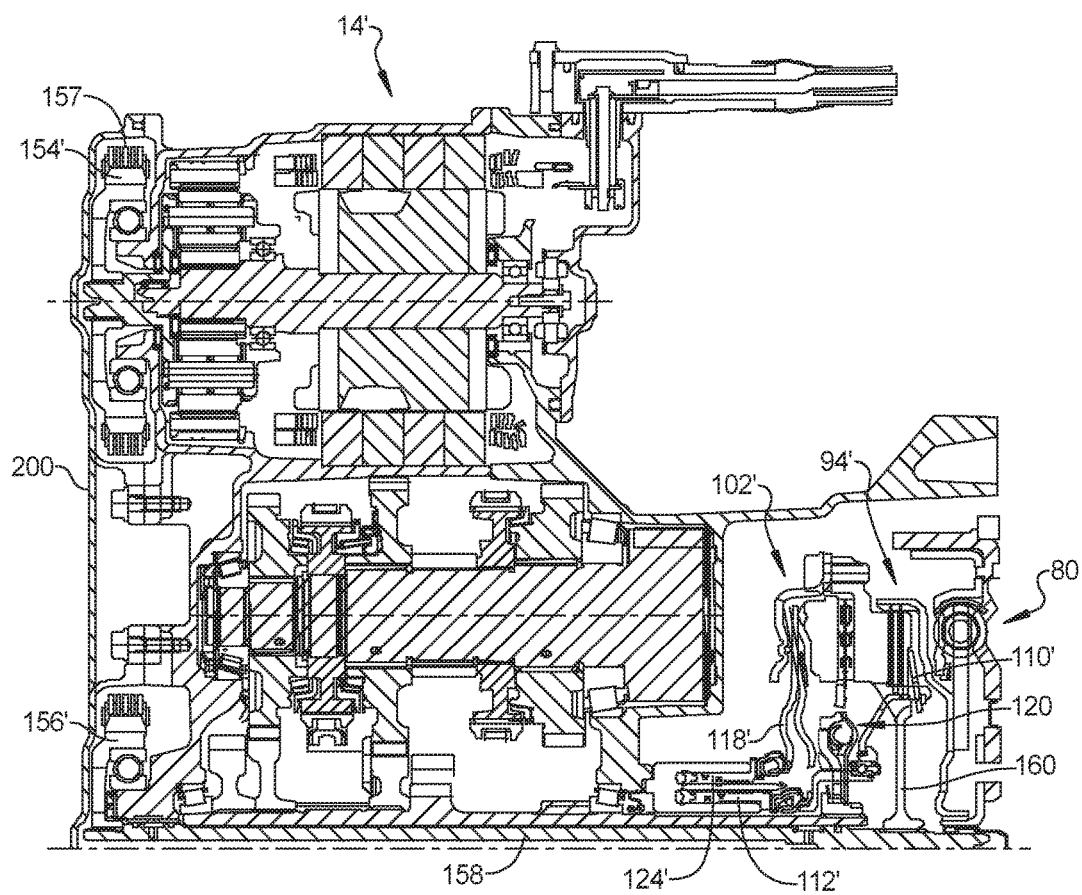
FIG. 6 is a schematic illustration of an alternative clutch system for engaging the electric motor of a hybrid manual transmission of a vehicle powertrain.

With reference to FIG. 6, the hybrid manual transmission 18' according to FIGS. 4 and 5 is shown modified to include a chain drive connection between the electric motor 14' and the primary input shaft 158. The chain drive connection in FIG. 6 includes a drive sprocket 154' that is drivingly connected to a driven sprocket 156' by a chain 157. A housing 200 is provided for covering the chain drive in order to allow for lubrication of the chain drive system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle powertrain, comprising:
    a manual transmission with an input shaft including a plurality of input gears and at least one main shaft including a plurality of driven gears engaged with the input gears;
    an engine having a drive shaft drivingly connected to the input shaft via a first clutch and a second clutch, wherein both the first clutch and the second clutch are concentric to the input shaft; and
    an electric motor drivingly connected to the input shaft via the second clutch;
    wherein the electric motor is non-concentric with the input shaft, wherein the electric motor is drivingly connected to the input shaft via a belt and pulley system, wherein the belt and pulley system includes a drive pulley connected to a drive shaft of the electric motor and a driven pulley connected to a primary input shaft concentric with the input shaft of the transmission, wherein the primary input shaft is selectively connected to the input shaft of the manual transmission via the second clutch.

2. The vehicle powertrain according to claim 1 wherein the electric motor includes the drive shaft connected to a planetary gearset, wherein the planetary gearset provides an output to the drive pulley that is drivingly connected to the input shaft of the manual transmission.

3. The vehicle powertrain according to claim 1, wherein the first clutch includes a first piston actuator and the second clutch includes a second piston actuator, wherein the first and second piston actuators are concentric with the input shaft.

4. The vehicle powertrain according to claim 3, wherein the first piston actuator includes a first piston disposed in a first cylinder chamber and the second piston actuator includes a second piston disposed in a second cylinder chamber, wherein the first cylinder chamber and the second cylinder chamber are concentric with the input shaft.

5. A vehicle powertrain, comprising:
    a manual transmission with an input shaft including a plurality of input pears and at least one main shaft including a plurality of driven gears engaged with the input gears;
    an engine having a drive shaft drivingly connected to the input shaft via a first clutch and a second clutch, wherein both the first clutch and the second clutch are concentric to the input shaft; and
    an electric motor drivingly connected to the input shaft via the second clutch;
    wherein the electric motor is non-concentric with the input shaft, wherein the electric motor is drivingly connected to the input shaft via a sprocket and chain system, wherein the sprocket and chain system includes a drive sprocket connected to a drive shaft of the electric motor and a driven sprocket connected to a primary input shaft concentric with the input shaft of the transmission, wherein the primary input shaft is selectively connected to the input shaft of the manual transmission via the second clutch.

6. A vehicle powertrain, comprising:
    a manual transmission with an input shaft including a plurality of input pears and at least one main shaft including a plurality of driven gears engaged with the input gears;
    an engine having a drive shaft concentric with the input shaft and drivingly connected to the input shaft; and
    an electric motor non-concentric with the input shaft and drivingly connected to the input shaft via a drive system, wherein the drive system includes one of a drive sprocket and drive pulley drivingly connected to a drive shaft of the electric motor and one of a driven sprocket and a driven pulley drivingly connected to the input shaft of the manual transmission, wherein the driven pulley is selectively connected to the input shaft of the manual transmission via a launch clutch.

7. The vehicle powertrain according to claim 6, wherein the drive shaft is drivingly connected to the input shaft by a first clutch and a second clutch that are each concentric with the input shaft and the electric motor is drivingly connected to the input shaft by the second clutch.

8. The vehicle powertrain according to claim 7, wherein the first clutch includes a first piston actuator and the second clutch includes a second piston actuator, wherein the first and second piston actuators are concentric with the input shaft.

9. A vehicle powertrain, comprising:
a manual transmission with an input shaft including a plurality of input pears and at least one main shaft including a plurality of driven gears engaged with the input gears;
an engine having a drive shaft concentric with the input shaft and drivingly connected to the input shaft; and
an electric motor non-concentric with the input shaft and drivingly connected to the input shaft via a drive system, wherein the electric motor includes a drive shaft connected to a planetary gearset, wherein the planetary gearset provides an output to one of a drive sprocket and a drive pulley that is drivingly connected to the input shaft of the manual transmission via one of a driven sprocket and a driven pulley.

10. The vehicle powertrain according to claim 9, wherein the one of a driven sprocket and a driven pulley is concentric with the input shaft of the manual transmission.

11. The vehicle powertrain according to claim 10, wherein the one of a driven sprocket and a driven pulley is connected to the input shaft via a primary input shaft that is concentric with the input shaft of the manual transmission.

\* \* \* \* \*